(12) United States Patent
Etchegoyen (10) Patent No.: US 8,881,280 B2
(45) Date of Patent: Nov. 4, 2014

(54) DEVICE-SPECIFIC CONTENT DELIVERY (71) Applicant: Uniloc Luxembourg S.A., Luxembourg (LU)

(72) Inventor: Craig S. Etchegoyen, Plano, TX (US)

(73) Assignee: Uniloc Luxembourg S.A., Luxembourg (LU)

(*) Notice: Subject to any disclaimer, the term of this patent is extended or adjusted under 35 U.S.C. 154(b) by 0 days.

(21) Appl. No.: 14/074,153

(22) Filed: Nov. 7, 2013

(65) Prior Publication Data
US 2014/0245442 A1    Aug. 28, 2014

Related U.S. Application Data

(60) Provisional application No. 61/770,662, filed on Feb. 28, 2013.

(51) Int. Cl.
*H04L 29/06* (2006.01)
*G06F 17/30* (2006.01)

(52) U.S. Cl.
CPC ...... *H04L 63/1408* (2013.01); *G06F 17/30386* (2013.01)
USPC ................ 726/23; 709/225; 709/229; 726/26

(58) Field of Classification Search
CPC ........................ H04L 63/1483; H04L 63/1441
USPC ................................. 726/23, 26; 709/225, 229
See application file for complete search history.

(56) References Cited

U.S. PATENT DOCUMENTS

| | | | |
|---|---|---|---|
| 4,200,770 | A | 4/1980 | Hellman et al. |
| 4,218,582 | A | 8/1980 | Hellman et al. |
| 4,323,921 | A | 4/1982 | Guillou |
| 4,337,483 | A | 6/1982 | Guillou |
| 4,405,829 | A | 9/1983 | Rivest et al. |
| 4,450,535 | A | 5/1984 | de Pommery et al. |
| 4,633,036 | A | 12/1986 | Hellman et al. |
| 4,652,990 | A | 3/1987 | Pailen et al. |
| 4,672,572 | A | 6/1987 | Alsberg |
| 4,747,139 | A | 5/1988 | Taaffe |
| 4,868,877 | A | 9/1989 | Fischer |

(Continued)

FOREIGN PATENT DOCUMENTS

| | | |
|---|---|---|
| EP | 1 903 518 | 9/2007 |
| GB | 2391965 | 2/2004 |

(Continued)

OTHER PUBLICATIONS

Moshchuk, Alexander, et al. "SpyProxy: Execution-based Detection of Malicious Web Content." USENIX Security. 2007.*

(Continued)

*Primary Examiner* — Syed Zaidi
(74) *Attorney, Agent, or Firm* — Sean D. Burdick (57) ABSTRACT

Devices of an individual's device-sphere recognize risky or undesirable behavior requested by devices outside of the device-sphere and allow the user to prevent the behavior. The user's decision is stored and used to protect all devices of the user's device-sphere from similar risky behavior from the outside devices. If the choice is made for all devices of the user's device-sphere, the choice is broadcast to other devices of the user's device-sphere such that other devices can benefit from the choice made by the user.

8 Claims, 5 Drawing Sheets

(56) References Cited

U.S. PATENT DOCUMENTS

| | | | |
|---|---|---|---|
| 4,977,594 A | 12/1990 | Shear | |
| 5,005,200 A | 4/1991 | Fischer | |
| 5,019,813 A | 5/1991 | Kip et al. | |
| 5,048,085 A | 9/1991 | Abraham et al. | |
| 5,050,213 A | 9/1991 | Shear | |
| 5,123,045 A | 6/1992 | Ostrovsky et al. | |
| 5,144,667 A | 9/1992 | Pogue, Jr. et al. | |
| 5,148,481 A | 9/1992 | Abraham et al. | |
| 5,155,680 A | 10/1992 | Wiedemer | |
| 5,162,638 A | 11/1992 | Diehl et al. | |
| 5,191,611 A | 3/1993 | Lang | |
| 5,204,901 A | 4/1993 | Hershey et al. | |
| 5,231,668 A | 7/1993 | Kravitz | |
| 5,239,648 A | 8/1993 | Nukui | |
| 5,249,178 A | 9/1993 | Kurano et al. | |
| 5,313,637 A | 5/1994 | Rose | |
| 5,349,643 A | 9/1994 | Cox et al. | |
| 5,418,854 A | 5/1995 | Kaufman et al. | |
| 5,606,614 A | 2/1997 | Brady et al. | |
| 6,098,053 A | 8/2000 | Slater | |
| 6,098,106 A | 8/2000 | Philyaw et al. | |
| 6,151,631 A * | 11/2000 | Ansell et al. | 709/229 |
| 6,163,843 A | 12/2000 | Inoue et al. | |
| 6,681,017 B1 | 1/2004 | Matias et al. | |
| 6,880,079 B2 | 4/2005 | Kefford et al. | |
| 7,032,110 B1 | 4/2006 | Su et al. | |
| 7,032,242 B1 | 4/2006 | Grabelsky et al. | |
| 7,310,813 B2 | 12/2007 | Lin et al. | |
| 7,444,508 B2 | 10/2008 | Karjala et al. | |
| 7,506,056 B2 | 3/2009 | Satish et al. | |
| 7,599,303 B2 | 10/2009 | Nadeau et al. | |
| 7,739,401 B2 | 6/2010 | Goyal | |
| 7,739,402 B2 | 6/2010 | Roese | |
| 7,818,573 B2 | 10/2010 | Martin et al. | |
| 7,852,861 B2 | 12/2010 | Wu et al. | |
| 7,965,843 B1 | 6/2011 | Maino et al. | |
| 8,018,937 B2 | 9/2011 | Epps et al. | |
| 8,020,190 B2 * | 9/2011 | Plummer | 726/1 |
| 2002/0010864 A1 | 1/2002 | Safa | |
| 2002/0099952 A1 | 7/2002 | Lambert et al. | |
| 2002/0112171 A1 | 8/2002 | Ginter et al. | |
| 2002/0163889 A1 | 11/2002 | Yemini et al. | |
| 2002/0178122 A1 | 11/2002 | Maes | |
| 2003/0063750 A1 | 4/2003 | Medvinsky et al. | |
| 2003/0070067 A1 | 4/2003 | Saito | |
| 2003/0131001 A1 | 7/2003 | Matsuo | |
| 2003/0149777 A1 | 8/2003 | Adler | |
| 2003/0182435 A1 | 9/2003 | Redlich et al. | |
| 2003/0190046 A1 | 10/2003 | Kamerman et al. | |
| 2003/0204726 A1 | 10/2003 | Kefford et al. | |
| 2003/0212892 A1 | 11/2003 | Oishi | |
| 2003/0217263 A1 | 11/2003 | Sakai | |
| 2003/0237004 A1 | 12/2003 | Okamura | |
| 2004/0003288 A1 | 1/2004 | Wiseman et al. | |
| 2004/0145773 A1 | 7/2004 | Oakeson et al. | |
| 2005/0033957 A1 | 2/2005 | Enokida | |
| 2005/0169271 A1 | 8/2005 | Janneteau et al. | |
| 2005/0187890 A1 | 8/2005 | Sullivan | |
| 2006/0075134 A1 | 4/2006 | Aalto et al. | |
| 2006/0095454 A1 | 5/2006 | Shankar et al. | |
| 2006/0130135 A1 | 6/2006 | Krstulich et al. | |
| 2006/0253584 A1 * | 11/2006 | Dixon et al. | 709/225 |
| 2006/0271485 A1 | 11/2006 | McKenzie et al. | |
| 2006/0280207 A1 | 12/2006 | Guarini et al. | |
| 2007/0005974 A1 | 1/2007 | Kudou | |
| 2007/0055853 A1 | 3/2007 | Hatasaki et al. | |
| 2007/0079365 A1 | 4/2007 | Ito et al. | |
| 2007/0153764 A1 | 7/2007 | Thubert et al. | |
| 2008/0022103 A1 | 1/2008 | Brown et al. | |
| 2008/0028114 A1 | 1/2008 | Mun | |
| 2008/0040785 A1 | 2/2008 | Shimada | |
| 2008/0049779 A1 | 2/2008 | Hopmann et al. | |
| 2008/0052775 A1 | 2/2008 | Sandhu et al. | |
| 2008/0076572 A1 | 3/2008 | Nguyen et al. | |
| 2008/0082813 A1 | 4/2008 | Chow et al. | |
| 2008/0097924 A1 | 4/2008 | Carper et al. | |
| 2008/0098471 A1 | 4/2008 | Ooi et al. | |
| 2008/0114709 A1 * | 5/2008 | Dixon et al. | 706/13 |
| 2008/0244739 A1 | 10/2008 | Liu et al. | |
| 2008/0282338 A1 * | 11/2008 | Beer | 726/12 |
| 2008/0298595 A1 | 12/2008 | Narayanan et al. | |
| 2008/0311994 A1 | 12/2008 | Amaitis et al. | |
| 2009/0003600 A1 | 1/2009 | Chen et al. | |
| 2009/0006861 A1 | 1/2009 | Bemmel | |
| 2009/0016264 A1 | 1/2009 | Hirano et al. | |
| 2009/0064323 A1 * | 3/2009 | Lin | 726/22 |
| 2009/0099830 A1 | 4/2009 | Gross et al. | |
| 2009/0113088 A1 | 4/2009 | Illowsky et al. | |
| 2009/0158426 A1 | 6/2009 | Yoon et al. | |
| 2010/0034207 A1 | 2/2010 | McGrew et al. | |
| 2010/0100962 A1 * | 4/2010 | Boren | 726/25 |
| 2010/0146589 A1 * | 6/2010 | Safa | 726/3 |
| 2010/0164720 A1 | 7/2010 | Kore | |
| 2010/0199188 A1 * | 8/2010 | Abu-Hakima et al. | 715/733 |
| 2010/0211795 A1 | 8/2010 | Brown et al. | |
| 2010/0269168 A1 * | 10/2010 | Hegli et al. | 726/11 |
| 2010/0281261 A1 | 11/2010 | Razzell | |
| 2011/0026529 A1 | 2/2011 | Majumdar et al. | |
| 2011/0047597 A1 * | 2/2011 | Mahaffey et al. | 726/3 |
| 2011/0090896 A1 | 4/2011 | Bradley | |
| 2011/0295988 A1 * | 12/2011 | Le Jouan | 709/223 |
| 2012/0275354 A1 | 11/2012 | Villain | |
| 2013/0166494 A1 * | 6/2013 | Davis et al. | 706/54 |
| 2013/0166609 A1 * | 6/2013 | Hao et al. | 707/804 |
| 2013/0283374 A1 * | 10/2013 | Zisapel et al. | 726/22 |
| 2014/0201528 A1 * | 7/2014 | Krig et al. | 713/168 |

FOREIGN PATENT DOCUMENTS

| | | |
|---|---|---|
| JP | 4 117 548 | 4/1992 |
| JP | 5181734 | 7/1993 |
| WO | WO 01/09756 | 2/2001 |
| WO | WO 2006/102399 | 9/2006 |
| WO | WO 2008/034900 | 3/2008 |
| WO | WO 2008/052310 | 5/2008 |

OTHER PUBLICATIONS

Eisen, Ori, "Catching the Fraudulent Man-in-the-Middle and Man-in-the-Browser," *Network Security*, Apr. 2010, pp. 11-12.

Housley et al., "Internet x.509 Public Key Infracstructure Certificate and CRL Profile," *The Internet Society*, Network Working Group, Sep. 1999, 75 pages [RFC 2459].

Zhu, Yunpu, "A New Architecture for Secure Two-Party Mobile Payment Transactions," Submitted to the School of Graduate Studies of the University of Lethbridge, Master of Science, 2010, 240 pages.

Ylonen et al., "The Secure Shell (SSH) Authentication Protocol," *Network Working Group*, Jan. 2006, 17 pages. RFC-4252.

Nesi, et al., "A Protection Processor for MPEG-21 Players," In Proceedings of ICME, 2006, pp. 1357-1360.

* cited by examiner

DEVICE-SPECIFIC CONTENT DELIVERY

This application claims priority to U.S. Provisional Application No. 61/770,662, filed Feb. 28, 2013, which is fully incorporated herein by reference.

BACKGROUND OF THE INVENTION

1. Field of the Invention

The present invention relates generally to computer network and, more particularly, methods of and systems for thwarting attacks from remotely located computers.

2. Description of the Related Art

Not too many years ago, an individual might have used one or two computing devices—perhaps one at work and perhaps one at home. Today, individuals use a wide variety of computing devices. For example, it's not uncommon now for an individual to have multiple computers at work, one or more at home (perhaps a desktop computer and a laptop computer), a smart phone (which includes a pocket-sized, fully functional computer), digital cameras (still and video), and one or more tablet computers. In addition, many household appliances in use today also incorporate fully functional computers. Such appliances include televisions, set-top boxes, personal video recorders (PVRs), digital media players, and networked music players.

The multitude of devices used by an individual can be thought as the individual's device-sphere. One of the challenges with maintaining security within one's device-sphere is that failure to block just one out of many thousands or millions of attacks across several devices can have dire consequences. A particularly difficult type of attack to block is a "zero-day" attack, i.e., an attack on a vulnerability before the vulnerability has been discovered by those building anti-virus and other security tools.

What is needed is a way to better protect devices of a user's device-sphere from numerous and even zero-day attacks.

SUMMARY OF THE INVENTION

In accordance with the present invention, devices of an individual's device-sphere recognize risky or undesirable behavior requested by devices outside of the device-sphere and allow the user to prevent the behavior. The user's decision is stored and used to protect all devices of the user's device-sphere from similar risky behavior from the outside devices.

A number of types of behavior a remotely located device can request are identified as risky and can be recognized by devices of the user's device-sphere. Examples of such risky behavior include installation of logic or software, modification of system configuration, and execution of logic received from a remotely located device.

When a device determines that a remotely located device has requested behavior that is identified as risky, the device determines whether the user has previously indicated that such behavior, when requested by the remotely located device, is allowed or denied. If the behavior is allowed, the device performs the requested behavior. If the behavior is denied, the device refuses to perform the behavior.

If the behavior is neither allowed nor denied, the user is provided with information regarding the nature of the behavior requested by the remotely located device and information regarding the remotely located device itself. The user is then provided with a user interface by which the user can specify that the requested behavior is allowed for this device, denied for this device, allowed for all devices of the user's device-sphere, or denied for all devices of the user's device-sphere.

The user's choice is recorded and used to allow or deny similar requests for risky behavior from the remotely located device. If the choice is made for all devices of the user's device-sphere, the choice is broadcast to other devices of the user's device-sphere such that other devices can benefit from the choice made by the user.

The result is that any risky behavior, even if not matched by any anti-virus or other security logic in the device, is brought to the attention of the user and the user is able to use knowledge of the usage context of the device to make intelligent decisions regarding device security. For example, if the user is informed that a computer in Russia or some other far away location is attempting to install logic, such as a web browser plug-in for example, the user can decide whether that request makes sense. The user may have just have requested that a web browser be installed by a music retail web site based in Russia. In that case, perhaps the server in Russia should be allowed to install the web browser plug-in. However, if the user has not had recent interaction with servers known to be in Russia, the user can prevent even a zero-day attack by just saying "No".

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

DETAILED DESCRIPTION

In accordance with the present invention, devices 102A-H (FIG. 1) of an individual's device-sphere recognize risky or undesirable behavior requested by devices outside of the device-sphere and allow the user to prevent the behavior. The user's decision is stored and used to protect all devices of the user's device-sphere from similar risky behavior from the outside devices.

Figure 1:
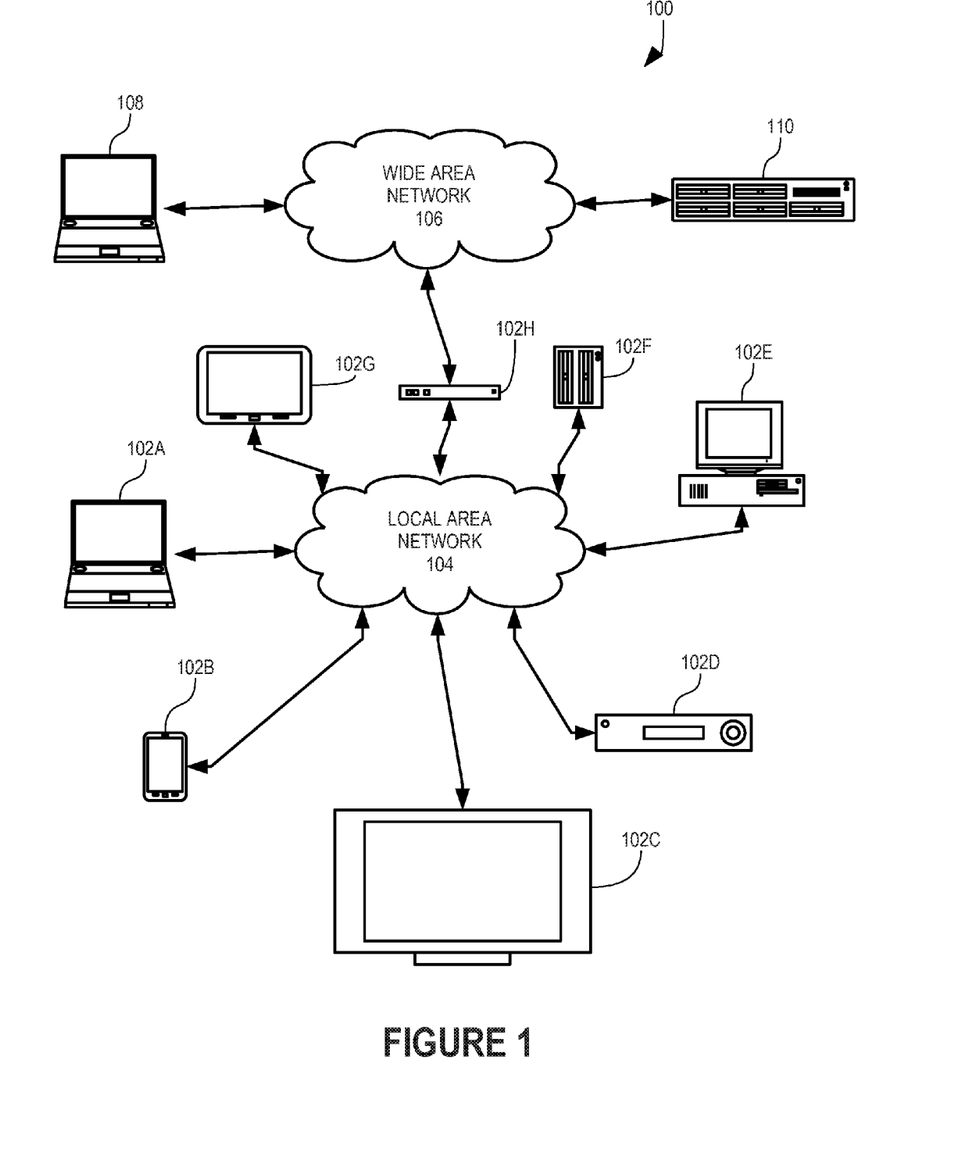
FIG. 1 is a diagram showing a number of devices that cooperate to control behavior requested by remotely located devices in accordance with one embodiment of the present invention.

In this illustrative example, the user's device-sphere includes devices 102A-H, device 108, and server 110. Devices 102A-H are coupled to one another through a local area network (LAN) 104, which can be owned and operated by the individual user in her home. There are a wide variety of computing devices that can be included in one's device-sphere; the devices shown in FIG. 1 are merely illustrative. Device 102A is a laptop computer. Device 102B is a smart phone. Device 102C is a modern, networked television. Device 102D is a networked PVR (Personal Video Recorder). Device 102E is a desktop computer. Device 102F is a NAS (Network-Attached Storage) appliance. Device 102G is a tablet computer. Device 102H is a router.

Device 108 is remotely located, being connected to LAN 104 though a wide area network (WAN) 106. In this illustrative embodiment, device 108 connects to LAN 104 through WAN 106 through a Virtual Private Network (VPN) connection. In this illustrative embodiment, WAN 106 is the Internet.

Server 110 is also connected to LAN 104 though WAN 106. Server 110 is a remotely located and untrusted computer.

Logic flow diagram 200 (FIG. 2) illustrates control of undesirable behavior by device 102A in accordance with the present invention. Devices 102B-H are analogous to device 102A and the following description of device 102A is equally applicable to each of devices 102B-H unless otherwise noted herein.

Figure 2:
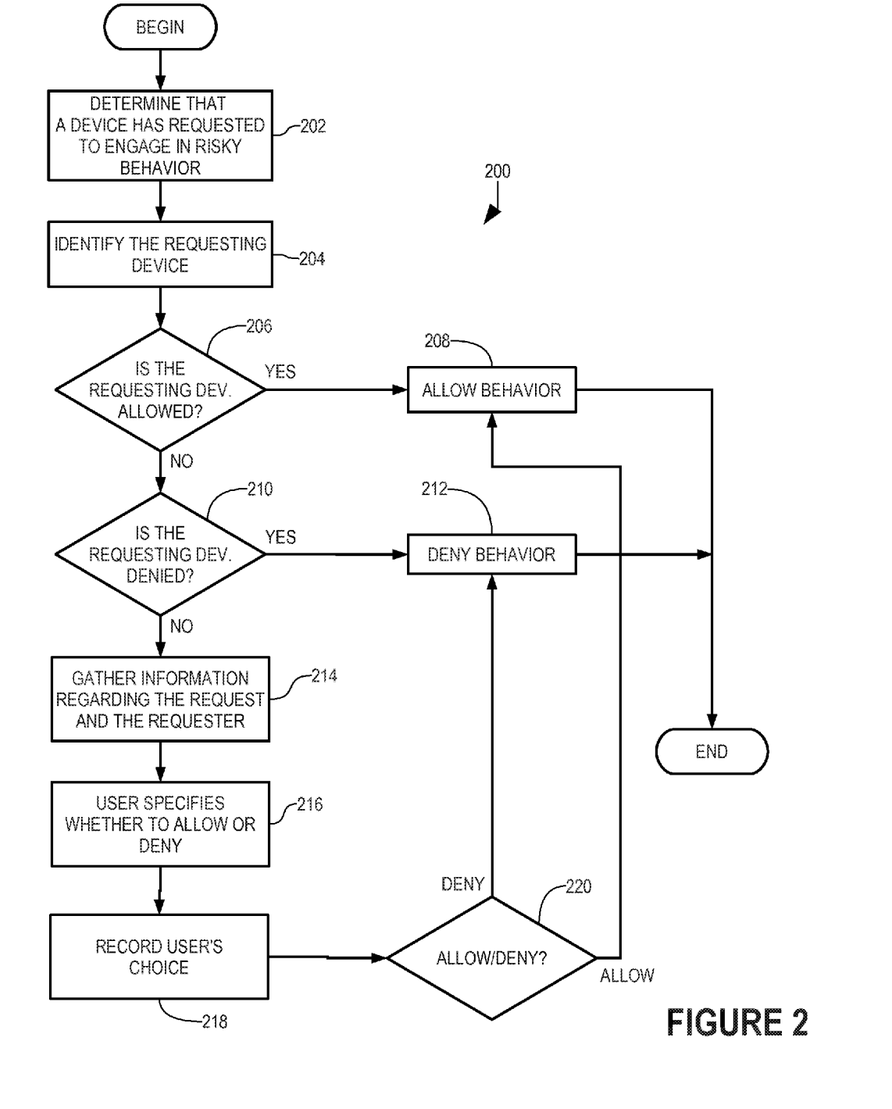
FIG. 2 is a logic flow diagram showing the manner in which behavior requested by remotely located devices is controlled in accordance with an embodiment of the present invention.
Figure 3:
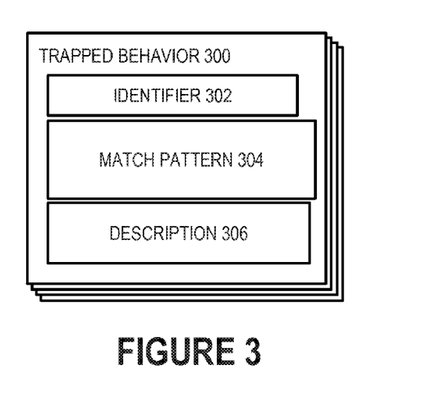
FIG. 3 is a block diagram showing a trapped behavior record that specifies a type of behavior to be controlled in accordance with the present invention.
Figure 7:
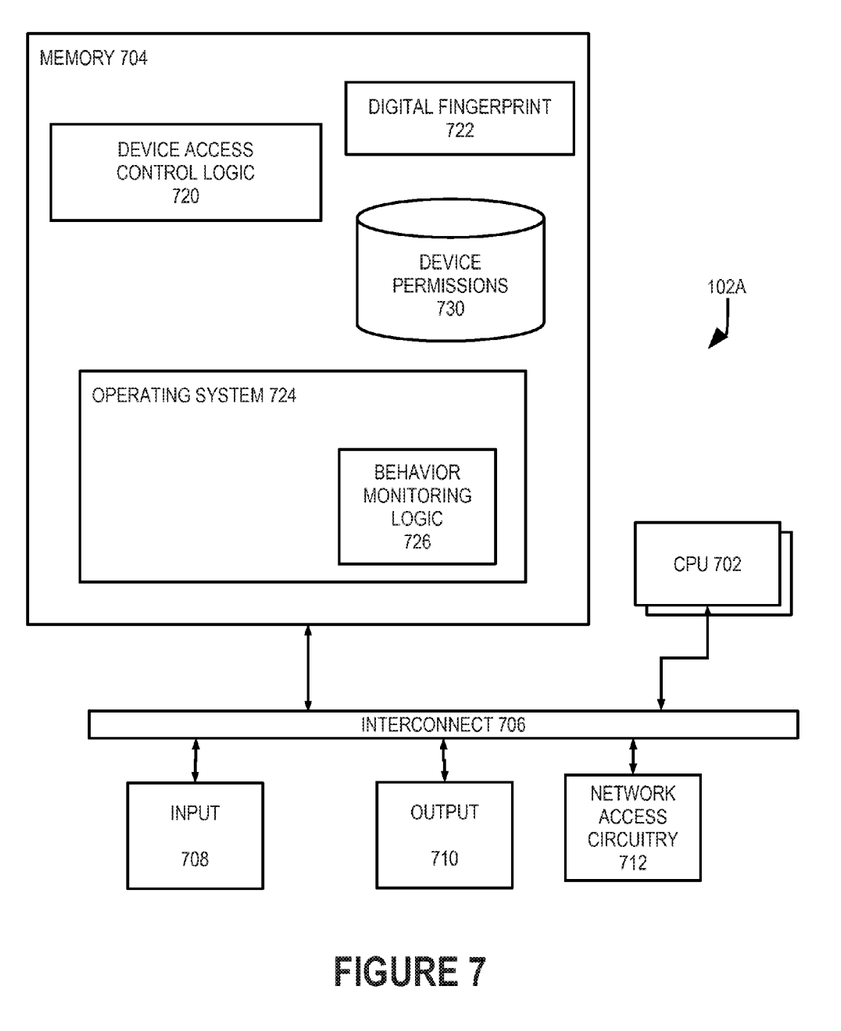
FIG. 7 is a block diagram of a device of FIG. 1 in greater detail.

In step 202, behavior monitoring logic 726 (FIG. 7) of device 102A determines that a remotely located device, e.g., server 110, has requested to engage in risky behavior. Behavior monitoring logic 726 accesses device permissions 730. Device permissions 730 includes a number of trapped behavior records such as trapped behavior 300 (FIG. 3). Trapped behavior 300 specifies a type of behavior to be trapped by behavior monitoring logic 726 (FIG. 7). Identifier 302 (FIG. 3) uniquely identifies trapped behavior 300 from other trapped behavior records within device permissions 730 (FIG. 7). Match pattern 304 (FIG. 3) specifies the manner in which behavior monitoring logic 726 recognizes imminent behavior as something to be trapped and controlled. In other words, if behavior monitoring logic 726 determines that imminent behavior matches match pattern 304, behavior monitoring logic 726 determines that the imminent behavior is risky.

Match pattern 304 can specify any of a number of events, including installation of logic into device 102A, modification of system configuration of device 102A, execution of logic received from a remotely located device, etc. Match pattern 304 can also specify URL patterns to block certain types of content from being retrieved and displayed by device 102A. For example, match pattern 304 can specify URL patterns matching many known servers of advertising to thereby block advertising on device 102A.

Description 306 (FIG. 3) provides a textual description of the trapped behavior matched by match pattern 304 such that the user can make an informed decision regarding whether the trapped behavior should be blocked.

Once behavior monitoring logic 726 (FIG. 7) has determined that a remote device has requested to engage in risky behavior in step 202 (FIG. 2), behavior monitoring logic 726 identifies the remote device in step 204. In particular, behavior monitoring logic obtains a globally unique identifier of the remote device. While IP addresses and MAC addresses can be used, a more robust device identifier such as a digital fingerprint is preferred in that digital fingerprints are much more difficult to spoof or alter.

Figure 4:
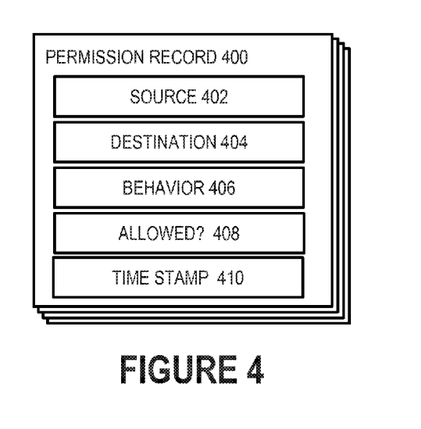
FIG. 4 is a block diagram showing a permission record that records a user's prior choice regarding whether a remotely located device is to be allowed to request a type of risky behavior.

In test step 206 (FIG. 2), behavior monitoring logic 726 determines whether the requesting remote device is allowed to perform the requested behavior. Device permissions 730 (FIG. 7) also includes a number of permission records, such as permission record 400 (FIG. 4). Source 402 specifies a remotely located device to which permission record 400 pertains. Destination 404 specifies to which of devices 102A-H and 108 permission record 400 pertains. Behavior 406 refers to a particular type of risky behavior by identifying a particular trapped behavior 300 (FIG. 3). Allowed flag 408 (FIG. 4) specifies whether the particular risky behavior is permitted by the remote device within the devices specified by destination 404. Time stamp 410 indicates the date and time permission record 400 was created.

To determine whether the requested behavior is allowed, behavior monitoring logic 726 retrieves a permission record 400 for which source 402 specifies the remotely located device, destination 404 specifies device 102A as one to which the permission record pertains, and behavior 406 specifies the particular type of behavior determined to be risky in step 202 (FIG. 2). If the retrieved permission record 400 (FIG. 4) indicates that the requested behavior is allowed, processing by behavior monitoring logic 726 transfers to step 208 (FIG. 2) in which behavior monitoring logic 726 allows the requested behavior to be performed. By including behavior monitoring logic 726 in operating system 724 (FIG. 7), behavior monitoring logic 726 is in a position to allow or block requested behavior.

Conversely, if the retrieved permission record 400 (FIG. 4) indicates that the requested behavior is denied, processing transfers from test step 206 (FIG. 2) through test step 210 to step 212 in which behavior monitoring logic 726 denies and blocks the requested behavior.

If behavior monitoring logic 726 is unable to retrieve a permission record 400 (FIG. 4) that specifies whether the requested behavior is allowed or denied, processing transfers through test steps 206 (FIG. 2) and 210 to step 214.

In this illustrative embodiment, behavior monitoring logic 726 causes device access control logic 720 to perform steps 214-218, allowing a user-space application to handle user-interface and other tasks not typically handled within operating system 724. In step 214, device access control logic 720 gathers information regarding the requesting remotely located device that can be helpful to the user in determining whether the requested risky behavior should be permitted. In this illustrative embodiment, device access control logic 720 determines the geological or geopolitical location of the remote device. One manner of determining geopolitical location of a remotely located device is described in U.S. Pat. No. 6,151,631 and that description is incorporated by reference.

Figure 5:
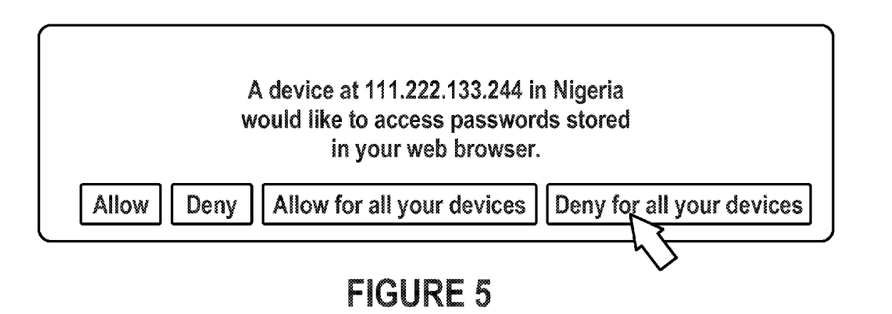
FIGS. 5 and 6 are each a diagram showing a user interface by which the user can make a choice regarding whether a remotely located device can request a particular type of risky behavior.
Figure 6:
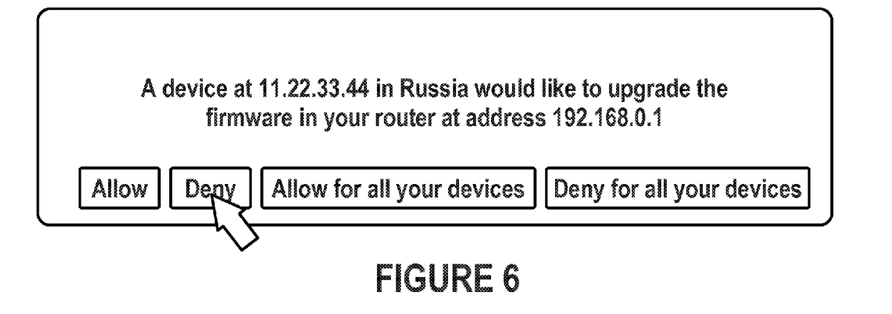

In step 216 (FIG. 2), device access control logic 720 asks the user to specify whether the risky behavior should be permitted by the requesting device using user-interface techniques. FIGS. 5 and 6 show illustrative examples of a prompt used by device access control logic 720 to inform the user of the requested risky behavior and to solicit the user's decision regarding allowing or denying the requested risky behavior. In FIG. 5, device access control logic 720 has identified the requesting remote device by IP address and its determined geopolitical location (e.g., "Nigeria"). In addition, description 306 (FIG. 3) of the requested behavior is "access passwords stored in your web browser."

The user can specify that the requested behavior is allowed for this device, denied for this device, allowed for all devices in her device-sphere, or denied for all devices in her device-sphere. The user indicates her choice by physical manipulation of one or more of user input device 708 (FIG. 7) using conventional user-interface techniques.

FIG. 6 illustrates the user-interface dialog when the risky behavior is requested of a device not normally used directly by the user. Examples include NAS appliances (device 102F—FIG. 1) and routers (device 102H). In the case of such devices, behavior monitoring logic 726 broadcasts a request for user intervention to all instances of device access control logic 720 currently executing. Thus, if the user is currently using device 102A, behavior monitoring logic 726 of device 102H requests that device access control logic 720 to perform steps 214-218 on behalf of device 102H.

In the example of FIG. 6, device access control logic 720 adds "in your router at address 192.168.0.1" to identify device 102H as the device for which risky behavior has been requested.

Once the user's decision has been received in step 216 (FIG. 2), device access control logic 720 forms a new permission record 400 (FIG. 4) and stores the new permission record 400 in device permissions 730 (FIG. 7) in step 218 (FIG. 2) to record the user's decision. Source 402 identifies the requesting remote device. Destination 404 identifies device 102A or, if the user chose to allow or deny for all her devices, devices 102A-H and 108. Behavior 406 identifies the trapped behavior 300 (FIG. 3) recognized by behavior monitoring logic 726 in step 202 (FIG. 2). Allowed flag 408 (FIG. 4) indicates whether the behavior is allowed or denied.

After step 218 (FIG. 2), processing resumes by behavior monitoring logic 726. In test step 220, behavior monitoring logic 726 determines whether the user specified that the behavior should be allowed or denied. If the user specified that the behavior should be allowed, processing transfers from test step 220 to step 208 in which behavior monitoring logic 726 allows the requested behavior. If the user specified that the behavior should be denied, processing transfers from test step 220 to step 212 in which behavior monitoring logic 726 denies the requested behavior.

Sometimes, device 102A determines a permission record 400 that pertains to one or more others of devices 102B-H and 108. For example, when the trapped behavior is requested of a device not normally used directly by the user, e.g., devices 102F and 102H, device 102A can be asked to interact with the user to determine whether the trapped behavior is to be allowed or denied. In addition, the user can specify that the trapped behavior is to be allowed or denied for all of devices 102A-H and 108. Logic flow diagram 218 (FIG. 8) illustrates recordation of the user's choice in step 218 (FIG. 2) in greater detail.

In test step 802 (FIG. 8), device access control logic 720 determines whether the choice to allow or deny pertains to a device other than device 102A. In so, processing transfers to step 804 in which device access control logic 720 communicates the user's choice directly to the other device.

Figure 8:
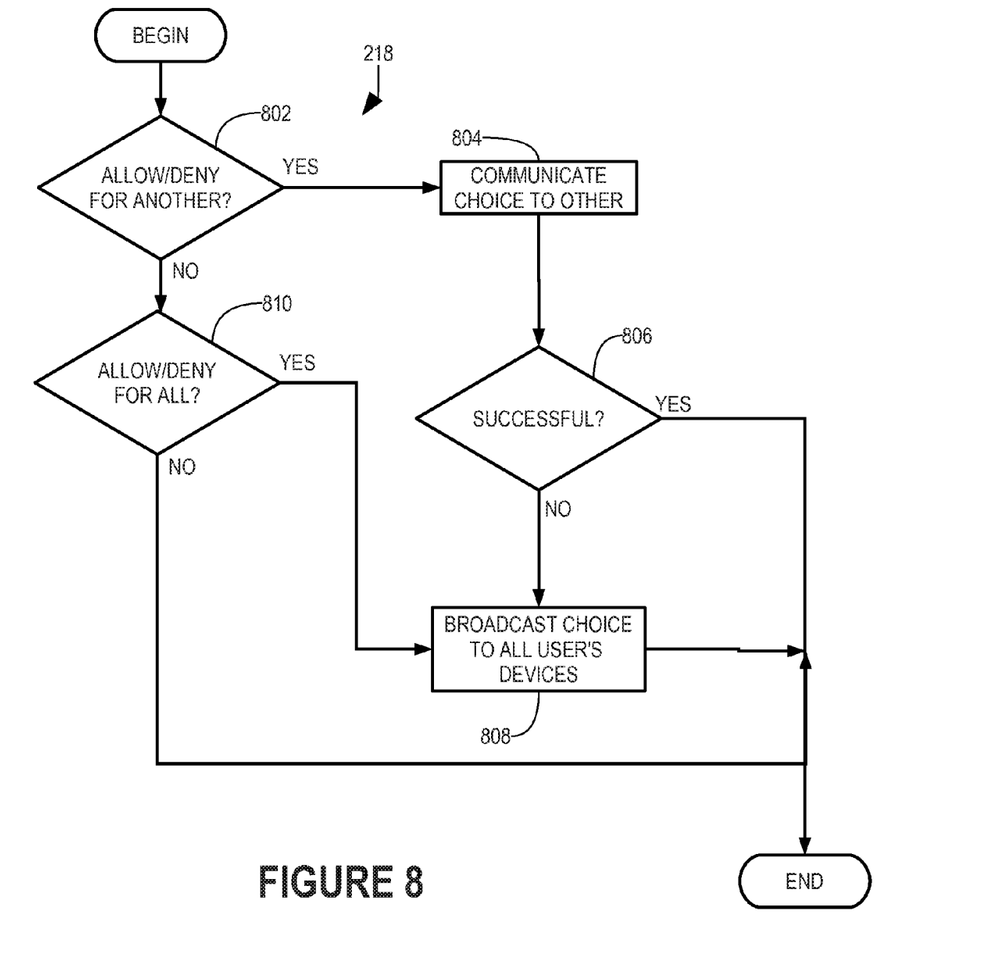
FIG. 8 is a logic flow diagram showing a step of the logic flow diagram of FIG. 2 in greater detail.

In test step 806, device access control logic 720 determines whether the choice was successfully communicated to the other device. If so, processing according to logic flow diagram 218, and therefore step 218 (FIG. 2), completes.

Conversely, if the choice was not successfully communicated to the other device, processing transfers to step 808 (FIG. 8), in which device access control logic 720 broadcasts the user's choice to devices 102B-H and 108.

Processing also transfers to step 808 when device access control logic 720 determines that the user's choice was not just for another device (test step 802) and was for all devices in the user's device-sphere (test step 810).

After step 808, processing according to logic flow diagram 218, and therefore step 218 (FIG. 2), completes. If the user's choice is for device 102A, device access control logic 720 skips step 808 from test step 810.

From time-to-time, one or more of devices 102B-H and 108 will not be operational and connected to LAN 104 (FIG. 1) and will miss user's choices as broadcast in step 808 (FIG. 8). Accordingly, each time each of devices 102A-H and 108 connect to LAN 104, the device broadcasts a request for all permission records and updates permission records in device permissions 730 (FIG. 7) when time stamp 410 (FIG. 4) indicates that a newly received permission record 400 is more recent than a corresponding permission record, or when there is no corresponding, in device permissions 730. Permission records are corresponding when their respective sources 402, destinations 404, behaviors 406, and allowed flags 408 match.

Device 102A is shown in greater detail in FIG. 7, which is equally representative of devices 102B-H and 108 except as otherwise noted herein. Device 102A includes one or more microprocessors 702 (collectively referred to as CPU 702) that retrieve data and/or instructions from memory 704 and execute retrieved instructions in a conventional manner. Memory 704 can include generally any computer-readable medium including, for example, persistent memory such as magnetic and/or optical disks, ROM, and PROM and volatile memory such as RAM.

CPU 702 and memory 704 are connected to one another through a conventional interconnect 706, which is a bus in this illustrative embodiment and which connects CPU 702 and memory 704 to one or more input devices 708, output devices 710, and network access circuitry 712. Input devices 708 generate signals in response to physical manipulation by a human user and can include, for example, a keyboard, a keypad, a touch-sensitive screen, a mouse, a microphone, and one or more cameras. Output devices 310 can include, for example, a display—such as a liquid crystal display (LCD)—and one or more loudspeakers. Network access circuitry 712 sends and receives data through computer networks such as LAN 104 (FIG. 1). Some of devices 102B-H and 108, e.g., devices 102F and 102H, can omit input devices 708 and output devices 710 and instead receive user commands through network access circuitry 712.

A number of components of device 102A are stored in memory 704. In particular, device access control logic 720 and operating system 724, including behavior monitoring logic 726, are each all or part of one or more computer processes executing within CPU 702 from memory 704 in this illustrative embodiment but can also be implemented using digital logic circuitry. As used herein, "logic" refers to (i) logic implemented as computer instructions and/or data within one or more computer processes and/or (ii) logic implemented in electronic circuitry.

Digital fingerprint 722 is data stored persistently in memory 704. Digital fingerprint 722 includes data specific to hardware elements of device 102A, such as serial numbers and parameters of hardware components of device 102A, to serve as a globally unique identifier of device 102A. Digital fingerprints are known and described in U.S. Patent Application Publication 2011/0093503 for "Computer Hardware Identity Tracking Using Characteristic Parameter-Derived Data" by Craig S. Etchegoyen (filed Apr. 21, 2011) and that description is incorporated herein in its entirety by reference.

Device permissions 730 is also data stored persistently in memory 704 and, in this illustrative embodiment, is organized as one or more databases. Device permissions 730 stores trapped behavior records such as trapped behavior 300 (FIG. 3) and permission records such as permission record 400 (FIG. 4).

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A method for preventing behavior in a user's device when the behavior is requested by a remotely located device through a computer network, the method comprising:
   determining that the behavior is predetermined to be potentially undesirable;
   determining whether the behavior, when requested by the remotely located device, is allowed, is prohibited, or is neither allowed nor prohibited;
   determining whether or not one or more other devices used by the user comprise an additional one or more devices of the user's device-sphere;
   upon a condition in which the behavior, when requested by the remotely located device, is allowed, performing the behavior;
   upon a condition in which the behavior, when requested by the remotely located device, is prohibited, refusing to perform the behavior; and
   upon a condition in which the behavior, when requested by the remotely located device, is neither allowed nor prohibited:
      using an output device of the user's device, informing the user of the behavior requested by the remotely located device;
      receiving, through an input device of the user's device, a signal generated by the user representing a choice of whether to allow or deny the behavior;
   upon a condition in which the choice is to allow the behavior:
      recording that the remotely located device is allowed to perform the behavior; and
      performing the behavior; and
   upon a condition in which the choice is to deny the behavior:
      recording that the remotely located device is not allowed to perform the behavior;
   and
      refusing to perform the behavior; and
   determining whether the choice is applicable to one or more other devices used by the user as part of the user's device-sphere; and
   upon a condition in which the choice is applicable to one or more other devices used by the user as part of the user's device-sphere, communicating the choice to each of the one or more other devices used by the user as part of the user's device-sphere.

2. The method of claim 1 wherein informing the user of the behavior requested by the remotely located device comprises:
   determine a physical location of the remotely located device; and
   informing the user of the physical location of the remotely located device.

3. The method of claim 2 wherein informing the user of the behavior requested by the remotely located device comprises:
   informing the user of a type of the behavior.

4. The method of claim 3 wherein determining whether the behavior, when requested by the remotely located device, is allowed, is prohibited, or is neither allowed nor prohibited comprises:
   requesting, from each of one or more other devices used by the user as part of the user's
device-sphere, data specifying whether the behavior, when requested by the remotely located device, is allowed or prohibited.

5. The method of claim 2 wherein determining whether the behavior,
   when requested by the remotely located device, is allowed, is prohibited, or is neither allowed
   nor prohibited comprises:
      requesting, from each of one or more other devices used by the user as part of the user's
device-sphere, data specifying whether the behavior, when requested by the remotely located device, is allowed or prohibited.

6. The method of claim 1 wherein informing the user of the behavior requested by the remotely located device comprises:
   informing the user of a type of the behavior.

7. The method of claim 6 wherein determining whether the behavior, when requested by the remotely located device, is allowed, is prohibited, or is neither allowed nor prohibited comprises:
   requesting, from each of one or more other devices used by the user as part of the user's device-sphere, data specifying whether the behavior, when requested by the remotely located device, is allowed or prohibited.

8. The method of claim 1 wherein determining whether the behavior, when requested by the remotely located device, is allowed, is prohibited, or is neither allowed nor prohibited comprises:
   requesting, from each of one or more other devices used by the user as part of the user's device-sphere, data specifying whether the behavior, when requested by the remotely located device, is allowed or prohibited.

* * * * *